United States Patent [19]

Gauthier

[11] Patent Number: 5,594,860
[45] Date of Patent: Jan. 14, 1997

[54] METHOD FOR BANDING AND RASTERIZING AN IMAGE IN A MULTIPROCESSOR PRINTING SYSTEM

[75] Inventor: Forrest P. Gauthier, Maineville, Ohio

[73] Assignee: Varis Corporation, Mason, Ohio

[21] Appl. No.: 379,735

[22] Filed: Jan. 27, 1995

[51] Int. Cl.$^6$ .................................................. G06F 15/00
[52] U.S. Cl. ..................... 395/501; 395/101; 395/115; 395/507
[58] Field of Search ................................. 395/100, 101, 395/115, 117, 162–166

[56] References Cited

U.S. PATENT DOCUMENTS

| | | | |
|---|---|---|---|
| 5,157,765 | 10/1992 | Birk et al. | 395/163 |
| 5,303,334 | 4/1994 | Snyder et al. | 395/109 |
| 5,500,928 | 3/1996 | Cook et al. | 395/133 |

*Primary Examiner*—Kee M. Tung
*Assistant Examiner*—U. Chauhan
*Attorney, Agent, or Firm*—Thompson Hine & Flory P.L.L.

[57] ABSTRACT

A printer controller system for converting a page description language datastream into a pagemap and for dispatching the pagemap to a print engine one band at a time. The system includes the steps of interpreting the PDL datastream to generate a plurality of rendering commands; partitioning the page into a plurality of bands; allocating memory for at least one of the bands; rendering a bitmap in the allocated memory by processing the rendering commands; monitoring access to the allocated memory while processing a rendering command; saving off the rendering command if the processing operation attempts to access memory outside of the allocated memory; and dispatching the bitmap to a print engine. The saved off rendering commands will be retrieved and processing of them will be resumed when rendering the bitmap of the next band. Preferably, the tasks of interpreting the PDL datastream, rendering the bitmaps of the bands, and dispatching the rendered bands, are performed in parallel by separate processing units.

23 Claims, 3 Drawing Sheets

METHOD FOR BANDING AND RASTERIZING AN IMAGE IN A MULTIPROCESSOR PRINTING SYSTEM

BACKGROUND OF THE INVENTION

The present invention relates to a method for rasterizing a page in the operation of a high-speed printing system, and more particularly, to a multiprocessor system and method for banding and rasterizing an output page image in which the speed of a raster image processor is optimized.

The printing industry has undergone significant advances in recent years, to the point that a print engine in a high-speed printing system now has the capability to print over a page per second. Printing technology is now so advanced, that printing capabilities are no longer limited by the print engine speed, but rather by the amount of processing time required to convert a page image from an application program format to a pagemap which can be processed by the print engine. The processing time required to generate a pagemap is a significant problem, since the demand for printing increasingly more complex images continues.

The printing process begins with the development of a page image in an application program such as Adobe Illustrator or Microsoft Word. To transform the page from the workstation display screen to a tangible document form, the application program generates a specification of the page's contents in a page description language or "PDL", such as Postscript by Adobe Systems Inc. The application program generates the specification in the form of a datastream of page description code which contains information regarding each of the objects on the page, the page address for each of the objects, and the format in which the objects appear on the page, such as the applicable font, shading, size and angle. The datastream is transferred from the workstation to a printer, where it is converted into a pagemap, which is a collection of millions of bits which each represent one point or dot on the page, also called a bitmap or raster image.

Traditionally, printing systems have utilized a single processor which interacts with the printer software to interpret the datastream and render a pagemap. The software interprets the objects, page addresses and print attributes in the datastream, generates bit maps of the objects, and merges the bitmaps into the pagemap at the appropriate page address. The application program arranges the objects in the datastream in the order in which they were created by the application program, thus enabling the datastream to be rendered sequentially while maintaining the proper relative relationship of the objects on the page. However, in systems of this type, in which the entire page is rendered before any part of the page is dispatched to the print engine, a large amount of memory is required to accommodate the entire pagemap. In addition, the processing time to generate a number of pages can be very high, since an entire page must be rendered prior to dispatch, and the system must wait for the dispatch operation to be completed before beginning to render the next page. Thus, while this system is beneficial in terms of maintaining the correct placement and relationship of the objects on the page, it is not practical in a high-speed printing system due to its high processing time.

Other systems have been developed which break the pagemap into geographical regions or "bands," and separately rasterize and dispatch each band. This banding scheme allows rectangular sections of the pagemap to be rasterized and dispatched to the print engine without rasterizing the entire pagemap. In the past, this technology was applied in situations where memory conservation was a critical factor or in situations where the printer hardware did not use a PDL and required a host computer system to interpret the PDL and deliver the image in sections. In these systems, banding was a means to circumvent the limitations of the printing hardware or software. Each band is a fixed rectangle encompassing a set number of rows and columns of bits in the pagemap, the number of rows and columns being tailored to the printer hardware. These systems do not require as much memory, since they need only enough memory to hold a band rather than an entire pagemap. These systems appear to enable the rendering and dispatching of bands to be carried out in parallel, thereby reducing the overall processing time. However, these systems have drawbacks which severely limit any performance benefits. Since the objects may be presented in any order, the rendering software may not allow the first band to be dispatched until the last object is examined. This is due to the possibility that the last object may affect the first band.

To address the lack of performance in these systems, a type of banding is employed which allows the rendering and dispatching operations to proceed in an interleaved manner. This achieves an increase in performance by allowing the print engine to imprint a section of the desired page while the next section is being generated. Like the previous solution, objects are created by interpreting the PDL data stream, but, before rasterizing, the software is made to sort and duplicate those objects. Sorting the objects by page address into the correct geographical order before rendering assures that, when mapped, each band includes all of the objects associated with the corresponding area of the page. In addition, since the objects are sorted, the software can detect when each band is finished and dispatch it while rendering the next band. Presorting consumes a large amount of processing time considerably slowing the printing speed. As the processor evaluates each object for the purpose of sorting, it must examine the rendering commands for each object, to determine the extent the object occupies the page and to determine the affected bands. Again, rectangular bands are used as it simplifies the geometry used in determining which bands are affected. Any object which affects multiple bands is duplicated for each band affected and the copies reserved for rendering subsequent bands. This subjects each object to a thorough geometric analysis to determine its extent and the manner in which it affects subsequent bands, thus consuming more processing time. Since the last object may affect the first band, the interpretation of the PDL data stream (object creation) must still be completed before the rendering and dispatch operations. At this point the software may begin rasterizing object into bands. The processor needs to examine each object a second time in order to limit the rasterization of large objects to the current band.

While the latter system provides some performance by interleaving the rasterizing of objects and dispatch of bands, it does not eliminate the need to presort the page objects in order to assure that all of the objects are mapped into the correct bands. Now the software must evaluate the rendering commands, sort them into precise order, analyze and duplicate them for subsequent bands before initiating the final stages where performance has been increased. Therefore, these systems still involve a processing bottleneck in interpreting, rendering and dispatching the page.

Thus, it is desirable to have a system for interpreting, rendering and rasterizing an image which substantially increases the effective speed of the raster image processor, in order to meet the growing need for faster and more efficient printing systems.

SUMMARY OF THE INVENTION

Accordingly, it is an object of the present invention to provide a pipelined, parallel processing system and method for ordering and rasterizing a page in bands in order to increase the effective rasterization speed.

This object is achieved by utilizing a print controller system having one or more processing units operating in parallel fashion to form a rasterization pipeline for a print engine. The task of converting a PDL data stream into a pagemap and delivering that pagemap to the marking engine is divided into sequential tasks distributed down the processing pipeline. The hardware and software are developed into a system in which these tasks operate autonomously without complex sorting or preprocessing. Together the processors interpret the page description code in the datastream, generate rendering commands, break the page into regions which need not be rectangular, order the rendering commands into the bands without duplication with slight regard for geometry, control the rasterization and dispatch bands to optimize the printing speed.

The first processor in the pipeline is an input/output processor which controls the hardware and communications for the print operations, including network communications and receipt of the datastream from the workstation. The input/output processor is connected to the second processor, the Main Processing Unit or "MPU", which controls the printing operation. The MPU interprets the datastream from the input/output processor to produce rendering commands, and performs the first stage of a two stage banding by breaking the page into a number of non-rectangular geographical regions or bands, associating a temporary memory area or "bucket" with each band, calculating page addresses for each of the rendering commands, identifying in which band each rendering command begins, and storing each rendering command in the bucket for the designated band. The term "non-rectangular" as used herein with respect to the bands means that the band size is not defined by a region of rows and columns but rather by the size of the memory segments fixed by the memory management unit. The term means that the bands are not necessarily rectangular. Infrequently, a band may correspond to a whole number of rows and columns and hence be rectangular.

The page data is organized in generation order in the datastream, and is processed and stored in the buckets in this order by the MPU. In the buckets, the rendering commands are stored sequentially in a linked list, with the last command in a bucket being linked to the first command in the next bucket so that all of the commands are-linked together. Each command is tagged with a generation sequence number which is a number indicating the order of creation.

The MPU is connected to the third processor, a graphics processing unit or "GPU". The GPU is a section of hardware which may include a CPU. The GPU may be a microprocessor having a memory management unit or it may be hardware which operates using higher machine language. The GPU creates bit maps from the rendering commands and performs the second stage banding. The MPU, periodically, transmits to the GPU the lists of accumulated rendering commands beginning with the first rendering command in the first non-empty bucket. Each rendering command contains data used in rendering the command, the upper left coordinate of the region affected called the offset address for that command, the processing environment or graphic state, and the command's sequence number. The first command received by the GPU instructs it to set up and use as the current pagemap either an old pagemap or to create a new, blank pagemap. From each subsequent command, the GPU generates bitmaps, merges previously generated raster images into the current pagemap, or modifies the current pagemap directly. The first command in the last batch (i.e., periodic transmission of commands by the MPU) identifies that batch as the last and that while the GPU is rendering, bands may be transmitting as each one is completed.

The GPU section also includes virtual memory management capabilities. Virtual memory management provides two services to the processor without requiring extra processing time. The first service is to allow the processor to segment ranges of it's physical memory into pages and to re-map or cause those pages to appear to be in other locations. This segmented memory is called band ram. The list of physical and apparent locations of these segments is stored in the memory management unit and is called a translation table. The other service provided by the memory management unit, is to cause an interrupt or memory fault in processor if it attempts to use memory which is not listed in the translation table. Processor architectures dictate that the size of these segments be a multiple of some unit size, always an integer power of two such as 1024. The performance of the second stage of the banding relies on the fact that the bands in this invention are non-rectangular in order to match a physical unit size of the sections's virtual memory management unit. Thus the processor may set up its memory management translation table to notify itself, via a memory fault, if a command exceeds the extent of a band or begins in a different band than the current one. Since this notification by memory fault requires no processing time, the second stage banding process eliminates all of the geometric analyses required to constrain the current rendering operation to the current band. Since the commands are ordered by band number, any new command which causes a memory fault notifies the processor that the current band is finished. An additional effect of defining the bandsize as an integer power of two rather than a rectangular region of rows and columns is that the MPU's first stage banding task, determining the proper band number for the beginning of each rendering command, is simplified down to a single processor instruction. Therefor the processor time devoted to the entire banding process is insignificant and allows the processors to devote this time to their other operations.

In this environment the operation of the GPU resides in rendering commands and initiating band transfers. The GPU sets or clears bits in the band RAM to merge the bitmaps from the GPU into the pagemap. If, while processing a command, the GPU causes a memory fault by attempting to set a bit that is outside of the designated band RAM, the GPU will reach outside of the band RAM and set or clear the bit, if the memory location for the bit is available. If the addressed bit is outside the scope of available memory, a fault occurs in the GPU. The fault triggers the GPU to store the current rendering command, and the corresponding offset address, indicating the extent to which the command has been processed, register contents and graphic state to a queue in memory. After storing the current command, address and graphics state in the queue, the GPU processes the next rendering command and continues generating bit maps for the current band. If, in conjunction with another rendering command, the GPU again attempts to set a bit that is outside of the band RAM and outside of available memory, the GPU again faults, triggering the system to store the command, graphic state and other information for the rendering command in the next location in the memory queue.

If the GPU fault occurs at the start of a new rendering command, the system interprets the fault as indicating that all of the rendering commands for the current band have been mapped and merged into the band RAM. The GPU initiates the dispatch of the contents of the band RAM to the print engine. While the band is dispatched by hardware connected to the band ram, the MPU continues transmitting rendering commands to the GPU so that bitmaps can be generated and merged into the next band. In addition to mapping the commands from the MPU, the GPU accesses commands from the queue to complete the rendering of commands interrupted by memory faults. The GPU selects between the MPU and queue commands based upon the commands' sequence numbers. The MPU continues transmitting rendering commands to the GPU, and triggering dispatch of the mapped bands upon the occurrence of a fault at a new command, until all of the rendering commands for the page have been rasterized and dispatched to the print engine. In this manner, the present invention uses virtual memory management capabilities in the image section to determine when a rendering command extends outside of the current band, in order to break the mapping between bands, and to detect when mapping of a band is complete and the band is ready for dispatch to the print engine.

In the present invention, rendering commands are processed only once for the appropriate band, rather than being processed for each band as in prior systems. The processing time required to band the pagemap is nearly eliminated. Further, in the present invention bands are interpreted, rendered and dispatched in parallel, thereby eliminating the need to wait for a band to be dispatched prior to initiating the mapping of a subsequent band, and enabling multiple pages to be printed at a significantly greater speed than prior art systems.

Accordingly, it is an object of the present invention to provide a raster image processing system having pipelined, parallel processing capabilities; a system in which the rendering commands for the page are ordered into a number of sequential bands prior to rasterization; a system in which the processing speed exceeds the mechanical speed of a print engine; a system which utilizes virtual memory management capabilities of a microprocessor to band a page; and a system which enables parallel processing of the page interpretation, rendering and dispatch functions.

Other objects and advantages of the present invention will be apparent from the following description, the accompanying drawings and the appended claims.

DETAILED DESCRIPTION

The present invention provides a system and computer-implemented method for converting a datastream describing the contents of a page in a page description language ("PDL") such as Postscript, to a pagemap or rasterized set of bits which can be dispatched to a print engine in a high-speed printing system. The method of using variable data fields with a PDL described in commonly assigned application Ser. No. 08/373,582 filed Jan, 17, 1995 in the name of Forrest Gauthier can be used with the present invention.

Figure 1:
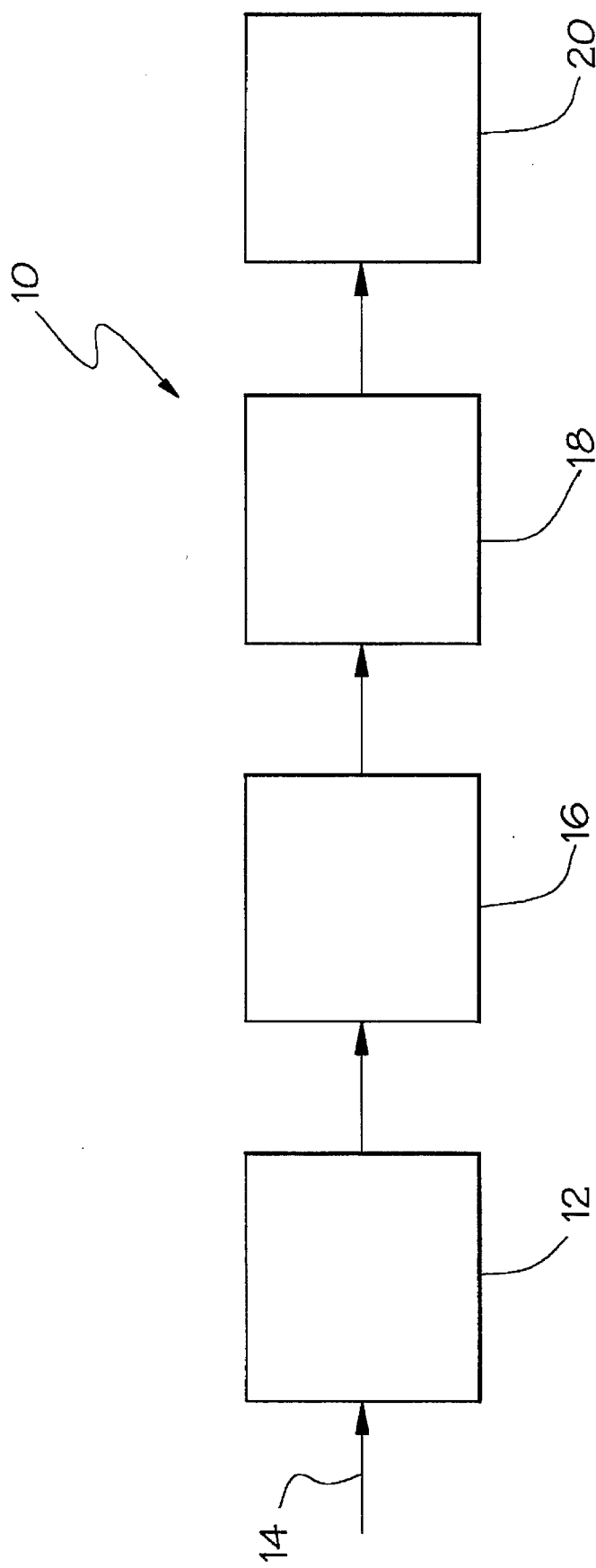
FIG. 1 is a block diagram of a raster image processing system according to the present invention.

The conversion of the PDL datastream to a pagemap is performed by a print controller system, generally designated as 10, having a series of central processing units or "CPUs" operating in a pipelined, parallel fashion such as shown in FIG. 1. The multiprocessors divide the interpreting, rendering and dispatching functions, thereby accelerating the rasterization of the pagemap. All three of the processors utilize real-time/multi-tasking software which operates asynchronously of the software in the other processors. The processors use a two channel 32 bit Harvard Architecture and follow the design rules for a Reduced Instruction Set Computer (RISC).

The first CPU in the pipeline is an input/output processor or "IOP" 12. This processor controls the input and output of data for the print operation. The IOP 12 receives a datastream 14 from an application program over a network in accordance with the standard network communications protocol, such as TCP/IP network software. In addition, the IOP 12 serves as an operator interface with the controller and performs error logging routines. In the preferred embodiment, the IOP 12 includes an IEEE 805 Ethernet interface, three serial ports, a 32 bit parallel interface, one block of 32 bit dynamic random access memory (DRAM), a bi-directional 32 bit first-in-first-out (FIFO) memory and a 120 pin Processor Direct Access connector.

The IOP 12 is connected to the main processing unit or "MPU" 16 which controls the printing operation. The MPU 16 interprets the PDL datastream, generates rendering commands and orders the rendering commands in a first banding stage. In the preferred embodiment, the MPU 16 is an AMD 29050 microprocessor utilizing one block of 32 bit Read Only Memory (ROM), two blocks of 3 bit DRAM, a 32 bit bi-directional FIFO memory and one block of dual ported DRAM.

The MPU 16 is connected to the third processor, a graphics processing unit or "GPU" 18. The GPU 18 functions as a dedicated slave co-processor to the MPU 16 to generate bit maps and perform second stage banding. In the preferred embodiment, the GPU 18 is a AMD 29000 microprocessor utilizing one block of 32 bit ROM, one block of 36 bit DRAM and a 32 bit bi-directional FIFO memory. The GPU 18 dispatches the bitmaps to a print engine 20 for printing.

Figure 2:
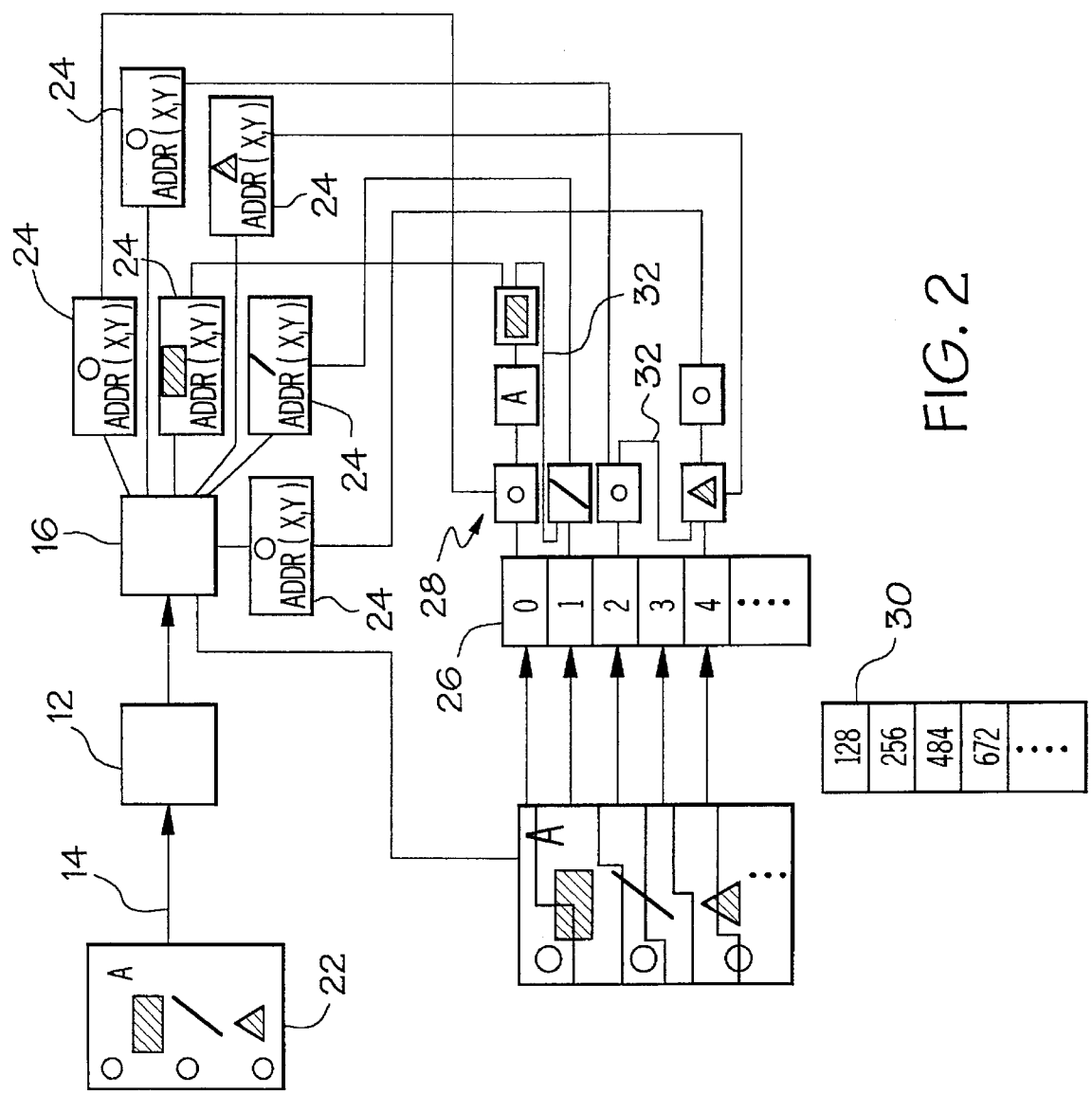
FIG. 2 is a data flow diagram depicting the operation of the master processing unit of the present invention.

As shown in FIG. 2, the print operation is initiated upon receipt by the IOP 12 of a datastream 14 containing the contents of a page 22. Upon receipt, the IOP 12 transmits the datastream to the MPU 16. If the datastream 14 is compressed in order to improve transmission through-put, the IOP 12 may uncompress the data stream as it is delivered to the MPU 16.

The MPU 16 parses and interprets the page description code of the incoming datastream to identify objects such as text characters and symbols, and to obtain information regarding the graphics state or processing environment in which the objects are to be rendered, such as the current font being used, and the current scale and rotation to be applied. From the datastream information, the MPU 16 generates rendering commands 24 which designate the object to be rendered, the graphics state to be applied and the offset address at which the rendered object is to be merged into the pagemap.

In addition to interpreting the datastream 12, the MPU 16 partitions the page into a number of non-overlapping geographic regions or bands 26, and establishes a number of temporary storage areas or "buckets" 28 in memory. Each of the buckets 28 corresponds to one of the bands 26 on the page. In the preferred embodiment, each page is divided into non-rectangular bands of a size matching the page size of the memory management unit in the GPU 18. The buckets 28 are used for a first stage banding of the rendering commands 24, in which each of the rendering commands is placed in the bucket corresponding to its geographic region on the page. To determine the appropriate bucket 28 for each command 24, the MPU 16 converts the starting address of the command to a bit number. The bits in a page are numbered sequentially horizontally across each row, and row by row down the page. The bit position of a rendering command 24 is calculated by adding the number of bits from the left side of the pagemap to the appropriate value in an array which stores the beginning bit number of each row. This determines in which band the starting bit falls. In the alternative, in the preferred embodiment in which the page is divided into bands of 8K bytes, the binary bit number can be divided by 64K to determine the appropriate band number for the command. This conversion is accomplished with one logical shift right of sixteen bits. The MPU 16 stores each of the commands 24 in the bucket 28 corresponding to the appropriate band 26.

Each of the objects in the datastream 12 has associated with it a sequence number corresponding to the order in which the object was created. This sequence number is stored along with the rendering command 24 in the appropriate bucket 28. As each new command 24 is stored in a bucket 28, it is linked to the previous commands in the bucket, and to the first command in the next bucket by pointers 32, so that a continuous chain is maintained between the commands in the buckets.

Figure 3:
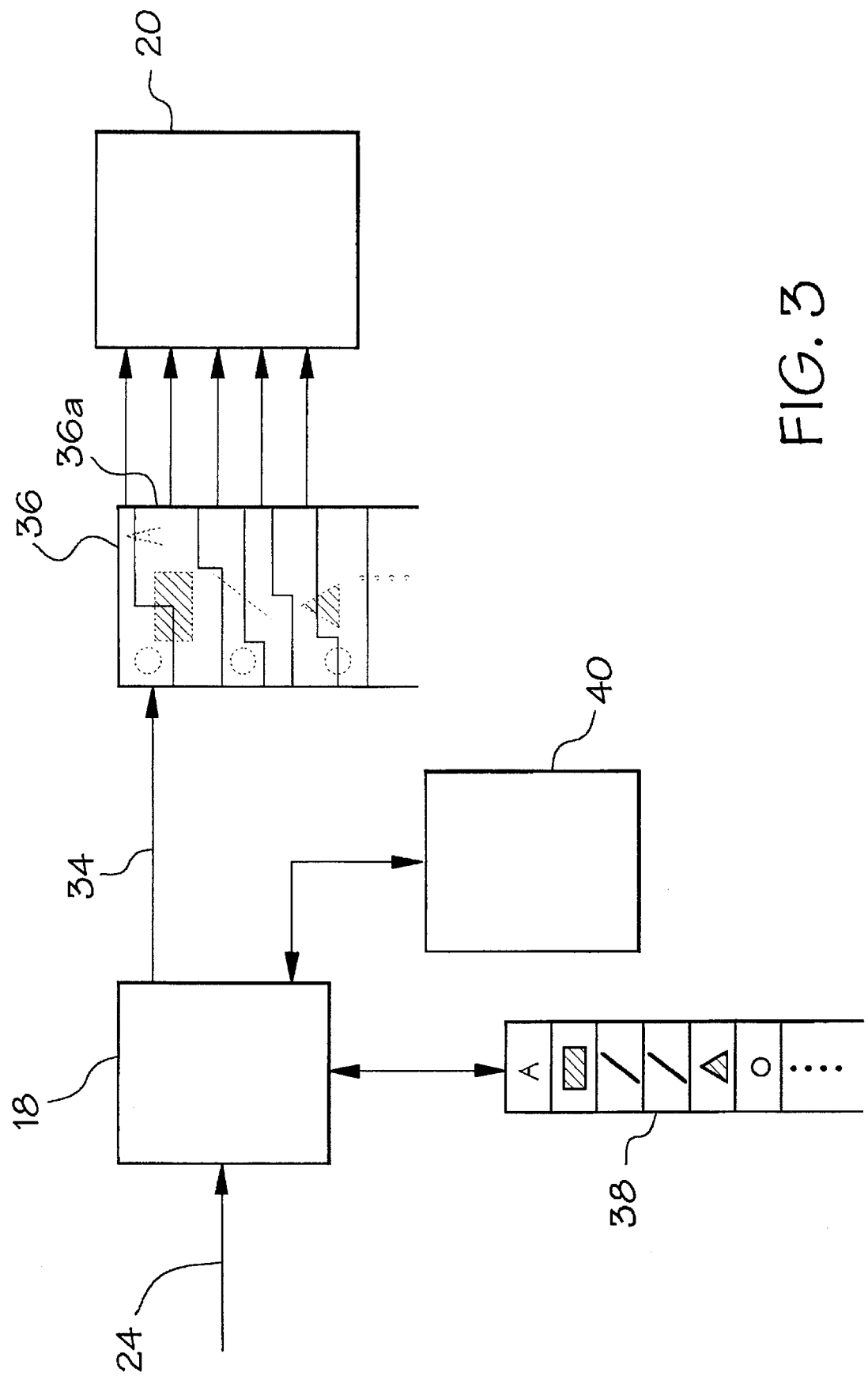
FIG. 3 is a data flow diagram depicting the operation of the graphics processing unit of the present invention.

After a batch of the commands 24 for a page have been divided and stored in the appropriate buckets 28, the MPU 16 accesses the commands, beginning with the first command in the first bucket, and transmits the commands one at a time to the GPU 18 as shown in FIG. 3. The commands 24 can be transmitted, for example, by a FIFO. The GPU 18 accesses the rendering commands 24 and generates bitmaps 34 for the text characters and symbols in accordance with the graphics state attributes specified in the commands in a conventional manner. The following are representative of the rendering commands which can be transmitted to the GPU: merge raster images, line draw, erase, boxes, curves, painted polygon, and dots.

In addition to the instructions to the GPU 18 to render and merge an object, the MPU 16 may instruct the GPU 18 to prerender specific pictures or characters according to the designated graphics state, and store the rendered bitmaps in a separate bit block transfer memory area 40 for later processing. When the prerendered bitmaps are required, the MPU 16 issues a rendering command to the GPU 18 specifying a bit block transfer of the designated bitmap from the memory area 40, and specifies the address at which to merge the prerendered bitmap into the pagemap. If the prerendered image is sufficiently large the MPU 16 and GPU 18 may use banding to speed the processing of the prerendered image.

In the present invention, the GPU 18 includes virtual memory management capabilities which are utilized for second stage banding of the rendered bitmaps. In response to a rendering command 24, the GPU 18 generates a bitmap of the specified object and merges the bitmap into the pagemap at the appropriate address. In the preferred embodiment, the GPU maps the bitmaps into 8K bytes of RAM 36, so that the page is mapped in bands, rather than as an entire pagemap. If the address specified in the rendering command 24 is inside of the band RAM 36, the GPU 18 maps the bits designated in the address, if the memory locations are available. However, if the bit address is outside of the available memory, the memory management unit in the GPU 18 produces a fault, which triggers the system to build a queue 38 in memory, and to "slice" and store the partially processed rendering command 24, as well as the address, register contents and graphic state that were being used when the fault occurred in the first position in the queue. In limited cases, the GPU can reach outside of band 36 and set or clear bits in band 36(*a*). This can occur if the memory has been allocated and the rendering command being processed has the lowest sequence number.

After the current command, graphics state and other information is stored in the queue 38, the MPU 16 transmits the next rendering command 24 to the GPU 18 which generates a bitmap 34 and merges the bitmap into the current band 36. If the GPU 18 again attempts to map to a memory address that is both outside of the band RAM 36 and unavailable, the GPU 18 issues another fault, again triggering the system to store the current command and other information in the next location in the queue 38. In this manner, the GPU 18 renders and maps the current band, detecting by means of a processor fault when a bitmap 34 extends outside of the band 36, and preserving the command and state in a queue 38 for later mapping into the correct band.

If a processor fault occurs at the initial instruction of a new rendering command 24, indicating that the starting address of the command is outside of the current band 36, the system assumes that mapping of the current band is complete and that the band is ready for dispatch. The GPU then loads the command which produced the fault, the current graphics state and associated data into the queue 38 and triggers hardware in the system to dispatch the current band to the print engine 20.

While the band 36 is being dispatched, the GPU 18 accesses the next command from the MPU 16 and begins rendering and mapping the next band 36. As a step in rendering the next band 36, the GPU 18 accesses the queue 38 and compares the sequence number of the first command in the queue to the sequence number of the command from the MPU 16. If the sequence number from the queue 38 is less than the sequence number of the next command from the MPU 16, the GPU 18 accesses the command and state 34 from the queue 38 and merges the bitmap into the current band 36. If the bitmap 34 from the queue 38 produces another fault, indicating that the bitmap is still extending outside of the current band 36 and available memory, then the remainder of the command is stored again at the lowest position in the queue 38 for later mapping into a subsequent band.

If the sequence number of the next rendering command 24 from the MPU 16 is lower than the next command in the queue 38, the GPU 18 generates a bitmap in accordance with the command from the MPU 16. The GPU 18 continues in this manner, comparing the sequence number of the next rendering command from the MPU 16 with the sequence number of the next command in the queue 38 and always processing whichever command has the lower sequence number, until all of the commands from the MPU 16 and queue 38 have been processed for the page 22. The commands 24 are processed in sequence number order to maintain the proper relative placement of the objects on the page.

In this manner, the present invention utilizes the virtual memory management properties of the GPU processor 18 to perform second stage banding of the page by determining when a bitmap extends outside of the available band, and storing the bitmap for later merging into a subsequent band. The present invention enables a page to be mapped without the need for software to determine how objects fit within the bands, since if a map extends outside of the available band RAM, the GPU triggers the system to capture and save the bitmap for processing in a later band. Since the GPU processor, and not the printer software, is being used to determine whether the bitmaps fit within the bands, much less processing time is required to render a page then previous systems, in which the software evaluated each rendering command to determine whether it would fit within the boundaries of the current band.

Further, since datastream interpretation takes place in the MPU 16, while rendering and mapping occurs in the GPU 18, these functions can be performed in parallel. Thus, the MPU 16 can begin interpreting a second page while the GPU 18 is rendering bitmaps and dispatching bands for the first page, enabling multiple page to be processed at a significantly greater speed.

While the system and method herein described constitutes a preferred embodiment of the invention, it is to be understood that the invention is not limited to this precise form and that changes may be made therein without departing from the scope of the invention.

What is claimed is:

1. A method for banding and rasterizing a datastream for a page image comprising the steps of:

interpreting a datastream containing a specification of said page image;

generating a plurality of rendering commands from said datastream;

dividing said page into a plurality of bands;

ordering said commands into a plurality of buckets corresponding to said bands;

accessing said commands from said buckets;

allocating memory for storing a bitmap of at least one of said plurality of bands;

processing one or more of said rendering commands from a bucket corresponding to said band to render a bitmap of said band in said allocated memory;

monitoring access to said allocated memory during said processing step to detect when said processing step attempts to access memory outside of said allocated memory; and dispatching said bitmap of said band to a print engine.

2. The method of claim 1 wherein said interpreting and dispatching steps occur in parallel.

3. The method of claim 2 wherein said interpreting, processing and dispatching steps occur in parallel.

4. The method of claim 3 wherein said commands are accessed in a sequential order from said buckets.

5. The method of claim 4 wherein each of said bands is nonrectangular and the size of each band is determined by the page size of a memory management unit.

6. The method of claim 1 wherein the step of ordering the commands includes:

determining a starting bit address for each of said commands; and ordering each of said commands in a corresponding one of said buckets by said starting bit address.

7. The method of claim 1 wherein the commands starting in a first band are processed prior to processing the commands starting in a subsequent band.

8. The method of claim 1 including the steps of detecting that processing of a command exceeds the memory allocated to a band; and storing the partially processed command in a memory queue.

9. The method of claim 8 further comprising the step of: accessing said queue prior to processing a subsequent command;

comparing a sequence number from the first command in said queue with the sequence number of said subsequent command; and processing the command associated with the lower one of said sequence numbers.

10. The method of claim 9 wherein said steps of interpreting the datastream, generating the rendering commands, dividing the page into bands, ordering the commands into the buckets, and accessing the commands are performed by a first microprocessor.

11. The method of claim 10 wherein the steps of allocating memory, monitoring access to the allocated memory and dispatching the bitmap of the band to a print engine are performed by a processing means other than the first microprocessor.

12. Method of claim 11 wherein the processing means is a second microprocessor which includes a memory management unit.

13. The method of claim 12 wherein said memory management unit produces an interrupt when the starting address of a new command begins outside the allocated memory of the band being rendered, and the interrupt signals the second microprocessor that all of the commands for the rendered band have been processed.

14. The method of claim 12 wherein said memory management unit generates an interrupt if the second microprocessor attempts to set a bit outside the memory allocated to the band being rendered, and the interrupt signals the second microprocessor to interrupt the command, queue the remainder of the interrupted command until the microprocessor initiates rendering the next band whereafter the interrupted command is resumed.

15. The method of claim 12 wherein the first rendering command generated by the first microprocessor instructs the second microprocessor to set up a new pagemap or to create a new blank pagemap and subsequent commands instruct the second microprocessor to merge raster images into the pagemap.

16. A method for generating a bitmap of an image defined by a page description language datastream and for printing the image, the method comprising the steps of:

interpreting the datastream to generate a plurality of rendering commands;

partitioning a page into a plurality of bands;

allocating memory for at least one of said plurality of bands;

rendering a bitmap in said memory according to at least one of said plurality of rendering commands;

monitoring access to said memory during said rendering step to detect when said rendering step attempts to access memory outside of said allocated memory; and dispatching said bitmap to a print engine.

17. The method of claim 16, further comprising the steps of:

responsive to detecting, in said monitoring step, that said rendering step attempts to access memory outside of said allocated memory, ceasing said rendering of said rendering command and storing said rendering command in a memory queue.

18. The method of claim 17, further comprising the steps of:

allocating memory for at least another one of said plurality of bands;

retrieving said rendering command from said memory queue; and resuming said rendering of said bitmap in said memory from said retrieved rendering command.

19. The method of claim 16, wherein said interpreting and rendering steps are performed in parallel.

20. The method of claim 16, wherein said interpreting and dispatching steps are performed in parallel.

21. The method of claim 16, wherein said rendering step is performed in parallel with a step of dispatching a second bitmap to said print engine.

22. A method for generating a bitmap of an image defined by a page description language datastream and for printing the image, the method comprising the steps of:

interpreting the datastream to generate a plurality of rendering commands;

partitioning a page into a plurality of bands, each band having a corresponding memory bucket;

determining a starting bit address for each of the rendering commands;

ordering each rendering command into the single bucket corresponding to the band in which said starting bit address of the rendering command resides;

rendering a first bitmap of a first one of the bands by processing the rendering commands ordered to the bucket corresponding to that band; and dispatching the first bitmap to a print engine.

23. The method of claim 22 further comprising the steps of:

during said rendering step, determining which of the rendering commands ordered to the bucket corresponding to the first band define objects which extend outside of the first band;

storing the rendering commands which define objects extending outside of the first band;

rendering a next bitmap of a next one of the bands by processing the stored rendering commands and by processing the rendering commands ordered to the bucket corresponding to the next band; and dispatching the second bitmap to a print engine.

* * * * *